Patented Nov. 19, 1940

2,222,431

UNITED STATES PATENT OFFICE 2,222,431

LUBRICATION

Philip Gordon Colin, Staten Island, N. Y., assignor, by mesne assignments, of three-fourths to Tide Water Associated Oil Company, New York, N. Y., a corporation of Delaware No Drawing. Application December 20, 1935, Serial No. 55,362

6 Claims. (Cl. 252—31)

This invention relates to lubricants intended for service in the lubrication of internal combustion engines. The invention more particularly is concerned with lubricating or motor oils of mineral hydrocarbon origin which are normally corrosive toward bearing metal alloys of the character of cadmium-silver, cadmium-nickel, or copper-lead; and has, for an important objective, the inhibition or prevention of deterioration of such bearing metal in service by the corrosive action of the lubricant thereon.

Engine bearings comprising cadmium-silver or like alloys now are frequently employed in lieu of the more usual Babbitt metal bearings, in order to cope with extreme service conditions of friction and temperature. These conditions are the consequence of modern developments in internal combustion engines making available high sustained speeds and requiring bearings formed of metals or alloys having greater resistance to wear, and further characterized by higher melting points necessary to prolonged life under the extreme thermal conditions existing during operation of the engine. Temperatures at the bearing surfaces during operation are or may be much higher in the case of engines requiring these new bearings than was formerly the condition with engines in which Babbitt metal bearings gave satisfactory service.

Experience with bearings of the character of cadmium-silver or like alloys has demonstrated, however, that their utility is greatly impaired by an extreme susceptibility to rapid deterioration by the corrosive action or effect of many available lubricating oils. Particularly has this effect been noted when the oils are of the character generally regarded as superior lubricants by conventional criteria. Little is known concerning the nature of the corrosive action or its causes; but in general it has been noted that highly refined motor oils derived from selected crudes predominantly paraffinic in origin, as well as those oils from these or other crudes which have been improved by treatment with selective solvents, exhibit a marked tendency toward corrosion of the bearings in question, although by other tokens the lubricant is of superior quality. Oxidation stability, as indicated by sludge or acid-formation, in conventional tests indicative of the tendency toward deterioration of the oil itself in service, does not appear to have any known correlation with the tendency of the oil to corrode bearing surfaces. It is possible that the high bearing surface temperatures frequently existing under service conditions with the new bearings may be a factor in occasioning reactions of a character unpredictable either as to nature, extent, or manner of inhibiting the deleterious effect thereof upon bearing alloys of the class including cadmium-silver, cadmium-nickel, and copper-lead. It would also appear that the problem of bearing corrosion with which the present invention is concerned contrasts with problems of lubricant deterioration per se, since oils characterized by long life and good stability may be just as corrosive as those of inferior grade. No theory in explanation of the observed corrosive action or the prevention thereof, as herein proposed according to the invention, is intended to be relied upon.

According to the present invention it has now been found that the corrosive effect of lubricating oils upon bearings of the character referred to may be avoided in novel and effective manner by incorporating a relatively minor proportion of elemental sulfur with the oil which it is intended to use for the lubrication of bearings formed of these newer alloys. It has been observed that sulfur as an addition agent to lubricants according to the invention has a remarkable effect in inhibiting or preventing bearing corrosion by oils which without the incorporation of this inhibitor cause an extremely rapid deterioration of bearing surfaces by corrosion thereof.

Viewed in another aspect the invention may be regarded as comprising or involving a novel method of lubricating bearing metal surfaces, of the character of cadmium-silver, cadmium-nickel, copper-lead or like alloys, by applying thereto a film of lubricant comprising mineral hydrocarbon oil having a fractional proportion of elemental sulfur incorporated therein. With this method of lubrication it has been found that prolonged life and consequent improved service may be attained in the use of these alloys as bearing metals for internal combustion engines, particularly when operating conditions such as high sustained speeds occasion unusually high bearing surface temperatures. Ordinarily the oil selected for use, in applying the lubricating method of the invention to its intended service, will be of a character generally regarded as of superior grade, and the invention finds particular utility in making possible the beneficial use of such oils by avoiding deleterious consequences otherwise encountered when no preventive measures are taken against the corrosive deterioration of bearing metal alloys as hereinbefore discussed. It will be understood, however, that the invention contemplates no limitation in this respect, and that the method of lubrication herein proposed may be practiced with the aid of hydrocarbon lubricating oils taken as a broad class and regardless of origin.

The quantity of sulfur to be added to lubricating oils in accordance with the invention does not appear to be critical insofar as its effectiveness or utility as a means of preventing bearing corrosion is concerned. Generally it has been found that relatively minor proportions less than one (1%) percent by weight may be used to good advantage and experiment has shown that additions of the order of 0.5% by weight and less are effective in achieving the desired ends. Thus, comparative tests, in which effort was made to simulate service conditions as closely as possible, have demonstrated that lubricating oil in which had been incorporated elemental sulfur in the proportion of 0.1% by weight can be utilized for the lubrication of bearings as described without appreciable corrosive deterioration thereof, whereas the same oil used alone occasioned a rapid corrosion and consequent short life. It is not intended, however, that the invention shall be limited to the specific illustrative proportions herein presented since the use of sulfur in lubricating this particular type of bearing is contemplated in proportions of less than 0.1% and of more than 0.5%.

Sulfur may be incorporated with mineral lubricating oil, for service in the lubrication of bearings as herein described, in a variety of ways and with or without the use of moderately elevated temperature to facilitate or expedite the addition. Thus, flowers of sulfur in desired amount may be stirred into the oil while at ordinary atmospheric temperature although the introduction of sulfur under these conditions ordinarily is a somewhat prolonged procedure. It may be preferred, therefore, to raise the temperature of the oil, say to 250° F. which is slightly above the melting point of sulfur, since under these conditions the addition of sulfur to the oil is more readily effected.

For comparative evaluation of lubricating oils in the laboratory, a convenient method indicating corrosive activity has been developed. In the test the bearings are supported in a chamber in which air may circulate, and the bearing surfaces are exposed for a period of 22 hours to a stream of oil sprayed under pressure continuously upon the corrodible area. The oil is maintained at a temperature of 335° F. and the spray is so directed as to disperse the oil over the surfaces of the bearing. Means are provided for re-circulating the sprayed oil so that a given quantity is used for a given test, thus simulating service conditions in an engine. The measure of corrosion is taken as the loss in weight of the bearing per unit of exposed corrodible surface.

The method of lubrication embodied in the present invention is, as explained hereinbefore, characterized by employing elemental sulfur for incorporation with mineral or hydrocarbon lubricating oils intended for service in internal combustion engines having bearings formed of alloys such as cadmium-silver, cadmium-nickel, copper-lead and the like. The utility and effectiveness of this novel departure from prior practice in bearing lubrication has been well demonstrated by comparative tests on oils which have been well refined to produce lubricants of good oxidation stability and otherwise generally superior in quality. Thus, samples of such oils, when applied to bearings of this type, have caused very substantial and rapid corrosion. By contrast, other samples of the oil to which had been added elemental sulfur in amounts of the order of 0.1% and 0.5% by weight showed substantially no corrosive effect.

In further more specific illustration of the efficacy of sulfur in preventing or inhibiting the corrosive action of mineral lubricating oil upon such bearings the following test data are presented.

The oil used was a high grade paraffin base motor oil having an A. P. I. gravity of 29.8, a viscosity @ 100° F. of 316 Saybolt seconds, a viscosity @ 210° F. of 55 Saybolt seconds, and a viscosity index of 109. It comprised a blend of solvent refined Pennsylvania neutral oil with conventionally produced Pennsylvania bright stock.

A sample of this oil was tested for bearing corrosion according to the procedure hereinbefore outlined, using cadmium-silver, cadmium-nickel, and copper-lead bearings respectively. At the end of 22 hours the loss in weight per square decimeter due to corrosion was measured and found to be:

| | Grams |
|---|---|
| Cadmium-silver | 8.1 |
| Cadmium-nickel | 6.6 |
| Copper-lead | 2.1 |

A check run on another sample of the same oil showed corresponding losses of 8.5 grams, 6.5 grams, and 2.4 grams respectively.

There was then incorporated with a fresh supply of the oil sulfur in the amount of 0.1% by weight, the sulfur being added by stirring into the oil while the latter was maintained at a temperature of about 250° F. in order to expedite solution. Tests on this oil, containing sulfur in the proportion indicated, gave bearing corrosion losses as follows:

| | Grams |
|---|---|
| Cadmium-silver | 0.5 |
| Cadmium-nickel | 2.2 |
| Copper-lead | 0.3 |

The remarkable effectiveness of added sulfur is apparent by comparison of the foregoing bearing corrosion losses. The effect was found to be even more marked when the proportion of added sulfur was increased, in another sample of the oil, from 0.1% to 0.5% as is indicated by the following results:

| | |
|---|---|
| Cadmium-silver | No loss |
| Cadmium-nickel | No loss |
| Copper-lead | No loss |

While the utility of the invention has been illustrated specifically with reference to a particular motor oil, no limitation is to be inferred therefrom, and other oils, whether or not comparable in specification or origin, may be used in the lubrication of bearings of the type described in accordance with the invention.

I claim:

1. In the lubrication of bearings, at least one of which is surfaced with an alloy having substantially the corrosion susceptibility characterizing cadmium-silver, cadmium-nickel and copper-lead alloys, with mineral hydrocarbon oil normally effective to cause corrosion thereof, the method of inhibiting such corrosion which comprises incorporating with said oil sulfur in small but sufficient proportion to retard the corrosion.

2. In the lubrication of internal combustion engines wherein are employed bearing surfaces comprising an alloy having substantially the corrosion susceptibility characterizing cadmium-silver, cadmium-nickel and copper-lead alloys with a hydrocarbon lubricating oil normally tending to cause substantial corrosion of such bearing surfaces, the method of inhibiting said corrosion which comprises incorporating with said oil added sulfur in a small but sufficient proportion to retard the corrosion.

3. A method of lubricating bearing surfaces which comprises maintaining between the bearing surfaces, one of which is an alloy having substantially the corrosion susceptibility characterizing cadmium-silver, cadmium-nickel and copper-lead alloys, a film of lubricating oil which initially produces an effective lubricating action but which would normally tend to corrode the aforesaid alloy, and maintaining the effectiveness of the lubricating oil by incorporating therein sulfur in a small but sufficient proportion to retard the corrosion.

4. A method of lubricating bearing surfaces which comprises maintaining between the bearing surfaces, one of which is an alloy having substantially the corrosion susceptibility characterizing cadmium-silver, cadmium-nickel and copper-lead alloys, a film of lubricating oil which initially produces an effective lubricating action but which would normally tend to corrode the aforesaid alloy, and maintaining the effectiveness of the lubricating oil by incorporating therein sulfur in proportions less than 1.0% by weight but sufficient to retard the corrosion.

5. A method of lubricating bearing surfaces which comprises maintaining between the bearing surfaces, one of which is an alloy having substantially the corrosion susceptibility characterizing cadmium-silver, cadmium-nickel and copper-lead alloys, a film of lubricating oil which initially produces an effective lubricating action but which would normally tend to corrode the aforesaid alloy, and maintaining the effectiveness of the lubricating oil by incorporating therein sulfur in proportions less than 0.5% by weight but sufficient to retard the corrosion.

6. A method of lubricating bearing surfaces which comprises maintaining between the bearing surfaces, one of which is an alloy having substantially the corrosion susceptibility characterizing cadmium-silver, cadmium-nickel and copper-lead alloys, a film of lubricating oil which initially produces an effective lubricating action but which would normally tend to corrode the aforesaid alloy, and maintaining the effectiveness of the lubricating oil by incorporating therein sulfur in proportions of the order of 0.1% to 0.5% by weight.

PHILIP GORDON COLIN.